Oct. 21, 1958 J. T. HOGG 2,857,197
ATTACHABLE TRAILER CLOSET
Filed Sept. 27, 1956

*INVENTOR.*
JOHN T. HOGG
BY *Elliott & Pastoriza*
ATTORNEYS

United States Patent Office 2,857,197
Patented Oct. 21, 1958

2,857,197

ATTACHABLE TRAILER CLOSET

John T. Hogg, Ventura, Calif.

Application September 27, 1956, Serial No. 612,493

7 Claims. (Cl. 296—37)

This invention relates generally to trailers and more particularly to an auxiliary trailer attachment for use with automobile house trailers.

The available room in present day house trailers is necessarily at a premium because of the required number of items for adequate and comfortable trailer living. There is very little room, if any, for auxiliary objects, which although not absolutely necessary, are highly desirable, for example, ironing boards, brooms, miscellaneous tools and other useful items which facilitate routine activities. Generally, such objects are acquired when the trailer is parked at a site, and are kept outside the trailer in a convenient box or other enclosure. When it is desired to move the trailer, these items must either be loaded inside the trailer or automobile or otherwise strapped to the trailer in some manner. If some special auxiliary storage space is provided on the exterior of the trailer, access to items stored therein cannot be had from inside the trailer. On the other hand, if the items are stored within the trailer, it is annoying and inconvenient when the trailer is parked to have to enter the trailer each time it is desired to secure a particular item.

Bearing the above in mind, it is a primary object of the present invention to provide a simple and rugged trailer attachment in the form of an enclosure or closet for housing auxiliary items, which does not use up any space within the trailer and yet in which access may readily be had from within the trailer.

Another important object is to provide an enclosure of the above type to which access may also be had from the exterior of the trailer.

Still another object of this invention is to provide an auxiliary trailer attachment for storing miscellaneous articles which may be manually removed from the trailer and located in any desired place at a trailer site.

These and many other objects and advantages of the present invention are attained by providing an enclosure, preferably in the form of a colset, having a vertical height at least equal to the vertical height of the conventional trailer door. A carriage means is provided for supporting the closet for longitudinal movement along one exterior side of the trailer so that the closet may be positioned in front of the trailer door and access had thereto through suitable access means in the side of the closet facing the trailer. The closet is also provided with an access means on its outer side for use from outside the trailer.

The carriage means is in the form of a transverse carriage structure extending partially underneath the trailer and having one end extending from the side of the trailer in a lateral direction. Suitable track means are provided running longitudinally under the trailer in spaced parallel relationship, one of the track means being adjacent the lower edge of the trailer side and the other being spaced inwardly towards the center of the trailer. The carriage structure is arranged to be coupled to these tracks by suitable roller means such that the protruding end from the side of the trailer is cantilevered and will readily support the weight of the closet resting thereon. Preferably, a driving means in the form of a motor actuated cable drum is provided so that the structure may be automatically longitudinally moved along the side of the trailer to any desired position. The coupling of the carriage structure to the track means is such that the entire carriage structure and closet may be removed or separated from the trailer relatively simply.

A better understanding of the invention as well as certain additional features and advantages thereof will be had by referring to a preferred embodiment as illustrated in the accompanying drawings, in which.

Figure 1:
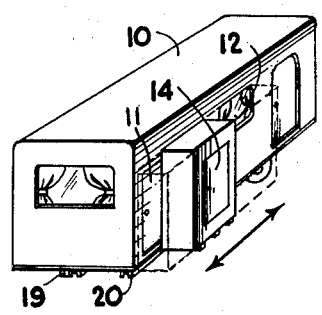
Figure 1 is a perspective view of a conventional type house trailer employing the trailer attachment of this invention.

Referring to Figure 1, there is shown a conventional house trailer 10 having a trailer door 11 and one or more side windows 12. In accordance with the present invention, the trailer attachment comprises an enclosure or closet 13 provided with an external access door 14 on one of its sides.

Figure 2:
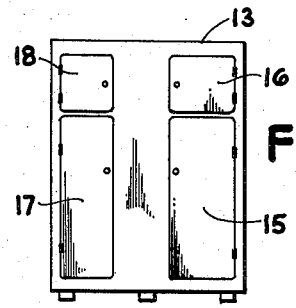
Figure 2 is a view of the side of the trailer attachment enclosure facing the trailer wall.

As shown best in Figure 2, the opposite side of the closet 13 facing the trailer side is also provided with access doors 15, 16, 17 and 18. Preferably, though not necessarily, four such doors are provided such that the upper doors 16 and 18 may be opened from inside the trailer through the window 12 when the closet is positioned in front of the window as indicated in dotted lines in Figure 1. Ordinarily, however, the closet 13 is arranged to be moved longitudinally along the side of the trailer from the position shown in Figure 1 to a position in front of the trailer door 11 as indicated in dotted lines whereby opening of the trailer door inwardly will enable access to be had to the closet 13 through any one of the doors 15 to 18. The mechanism for longitudinally moving the closet 13 along the side of the trailer comprises a carriage means arranged to be supported and ride along a pair of track structures indicated generally in Figure 1 at 19 and 20 passing in parallel spaced relationship under the trailer.

Figure 3:
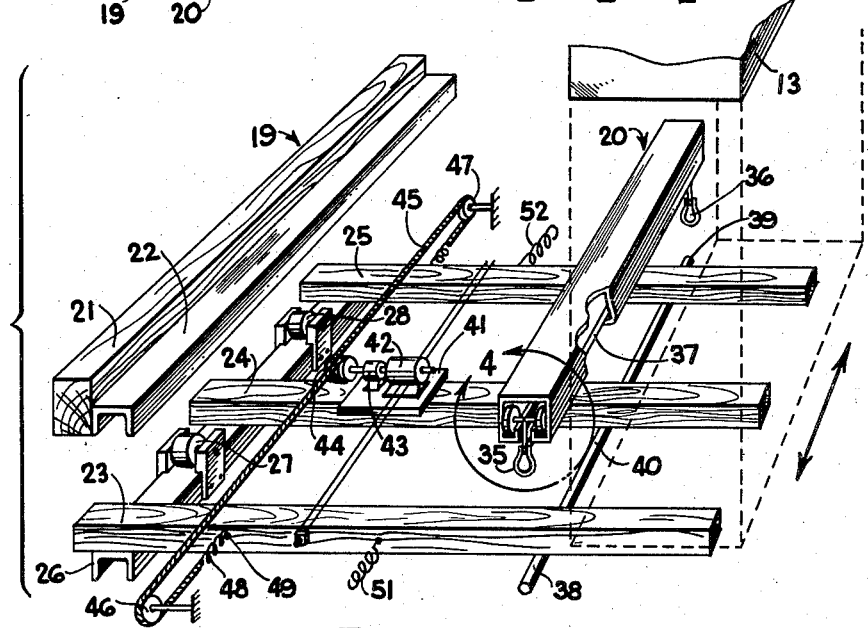
Figure 3 is an exploded schematic perspective view of the carriage means for effecting longitudinal movement of the enclosure along one side of the trailer.

In the exploded view of Figure 3, the track means 19 and 20 are shown in greater detail. The first track means 19 comprises a main support beam 21 which is rigidly secured to the underside of the trailer 10 as by suitable bolts (not shown). The support beam 21 in turn carries a C-shaped channel iron 22 secured to the beam 21 such that the opening of the C faces downwardly.

The carriage proper comprises three transverse beams 23, 24 and 25 rigidly held at their inner ends by a cross channel iron 26. The channel iron 26 is also arranged to support a first roller means comprising rollers 27 and 28 positioned between the beams 23, 24 and 25 as shown. While only two such roller means have been illustrated, it will be evident that further rollers could be added if desired. However, at least two spaced rollers are necessary in order to achieve stability. The arrangement is such that the rollers face upwardly whereby they will bear on the undersurface within the inverted C-shaped channel 22.

Figure 4:
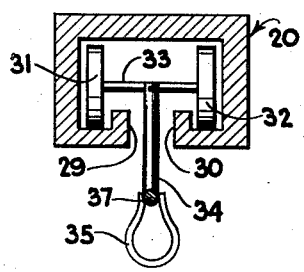
Figure 4 is an enlarged elevational view partly in cross section of that portion of Figure 3 enclosed within the circular arrow 4; and, Figure 5 is a plan view illustrating in greater detail the driving mechanism for the carriage of Figure 3.

The second track means 20 also comprises an elongated C-shaped channel iron preferably secured immediately under the lower edge of the trailer side as indicated in Figure 1. As best seen in the elevational view of Figure 4, the second track means 20 includes turned in and upwardly directed flanges 29 and 30 providing roller bearing grooves for guiding a pair of rollers 31 and 32 secured together by a cross axle 33. This second roller means also includes a downwardly depending support rod 34 to which is secured a flexible band 35.

An identical roller means is also provided at the other end of the channel 20 and includes a supported band 36 as indicated in Figure 3. Preferably, the support rod 34 and band 35 are held in spaced relationship with respect to the band 36 by a suitable tie rod 37 as indicated in the broken away portion of the channel 20 in Figure 3 and in cross section in Figure 4.

The bands 35 and 36 are arranged to loop over the ends 38 and 39 respectively of a longitudinal solid supporting rod 40 when the components illustrated in the exploded view of Figure 3 are assembled. It will be noted that by this arrangement of coupling the second roller means to the carriage structure, there is provided a cantilevered portion extending laterally from the trailer side on which the closet 13 rests when in position. The weight of the closet 13 is such that the force moment arm with respect to the second track means 20 is balanced by the force moment resulting from the bearing force of the first track means 22 on the rollers 27 and 28. In other words, the weight of the closet 13 in position on the cantilevered portion of the carriage structure is sufficient to tend to rotate the transverse carriage structure clockwise as viewed in Figure 3 about the band loops 35 and 36 on support rod 40 such that the wheels 27 and 28 are urged upwardly into engagement with the track 22.

From the above description of the carriage means, it will be evident that the carriage and closet structure may be readily removed from the trailer by simply lifting the closet 13 from the cantilevered portion of the carriage. The removal of weight from this cantilevered portion will then result in the rollers 27 and 28 simply dropping out from the C-shaped channel 22. The loop bands 35 and 36 may then be manually removed from the ends 38 and 39 of the support rod 40 and the carriage itself moved from the underside of the trailer. In assembling the carriage, the reverse steps are taken, the loops 35 and 36 first being placed over the rod ends 38 and 39 and the closet then being placed on the cantilevered portion of the carriage whereby the carriage structure is rotated to cause the rollers 27 and 28 to engage within the C-shaped channel 22.

Figure 5:
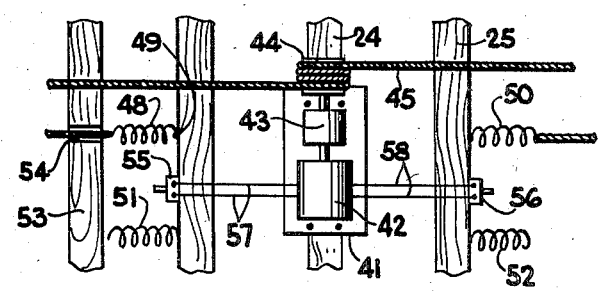

In order to enable the carriage to be moved longitudinally along the tracks from within the trailer, a motor drive means is preferably employed. One such motor drive means is illustrated in Figures 3 and 5 as comprising a mounting plate 41 supporting an electric motor 42. The shaft of motor 42 passes through a reduction gear box 43 to a drum 44. Drum 44 is provided with a cable 45 wound about the drum and having its ends extending longitudinally towards the front and rear portions of the trailer to pass over suitable pulleys 46 and 47 rigidly secured to the trailer adjacent its rear and front ends respectively. Rotation of the drum will thus cause the carriage to move towards one or the other of the pulleys 46 or 47.

Referring particularly to the detailed plan view illustrated in Figure 5, it will be noted that the outer free ends of the cable 45, after passing over the pulleys 46 and 47, are connected through suitable springs 48 to one of the beam members of the carriage as at 49. A similar cushioning spring 50 is provided for the free end of the other end of the cable 45. Also, there is preferably provided a second set of buffer springs 51 and 52 spaced from the springs 49 and 50 and arranged to bear against suitable stop means such as the stop means 53 illustrated in Figure 5, which is rigidly secured at each of the ends of the understructure of the trailer.

For example, in Figure 5 the stop means 53 is provided with an opening 54 through which the cable 45 may pass. Further, suitable safety switches 55 and 56 connected by wires 57 and 58 to the motor 42 respectively may be provided to shut off the motor when the carriage has reached one extreme end of travel. Each of the switches 55 and 56 are actuated by the stop means such as the stop means 53 for the switch 55 when the carriage is moved to such an extreme position to cause the switch 55 to engage the stop 53. Such limit switches are so well known in the art that they need not be described in detail here. It may be stated, however, that the motor 42 is preferably a reversible motor and the switches are connected such that they will interchange the field windings of the motor to place it in a condition for reverse operation whereby throwing of a second switch within the trailer will cause the carriage to move in an opposite direction. Stopping of the motor at any time will stop movement of the carriage and the closet in any desired position and such position will be held by friction of the cable 45 about the drum 44.

It will thus be seen that the present invention provides a relatively simple and rugged trailer attachment wherein additional space is provided to which access may be had from either the inside or the outside of the trailer for carrying miscellaneous items without increasing any of the space requirements within the trailer. Further, because of the unique carriage construction, the attachment may be readily removed from the trailer when it is desired to use the trailer separately or to locate the auxiliary enclosure at a more convenient position once the trailer has been moved to a relatively permanent trailer site.

Minor modifications within the spirit and scope of the present invention will readily occur to those skilled in the art. The invention is, therefore, not to be thought of as limited to the particular details illustrated in the accompanying drawings for explanatory purposes.

What is claimed is:

1. An auxiliary trailer attachment for a trailer having an exterior side trailer door, comprising, in combination: an enclosure; carriage means supporting said enclosure adjacent said exterior side of said trailer for longitudinal movement along said side so that said enclosure is movable in front of said trailer door said carriage means including a transverse supporting carriage passing partially under said trailer and having an end portion laterally extending from said trailer side for supporting said enclosure; track means secured to and running longitudinally along the underside of said trailer; roller means coupling said carriage to said track means; a first access means on one side of said enclosure for removing objects therefrom from the outside of said trailer; and a second access means on another side of said enclosure facing said side of said trailer for removing objects therefrom from the interior of said trailer through said trailer door when said enclosure is positioned in front of said trailer door.

2. A trailer attachment according to claim 1, including motor means for moving said carriage back and forth along said track means.

3. A trailer attachment for supporting an enclosure to an exterior side of a trailer for longitudinal movement along said side comprising, in combination: a transverse supporting carriage having one end extending laterally from the lower edge of said trailer for supporting said enclosure, and its other end extending under said trailer; a first longitudinal track secured under said trailer; first roller means secured to the said other end of said carriage adapted to ride in said first track; a second longitudinal track adjacent the lower edge of said side of said trailer; second roller means adapted to ride in said second track; and coupling means for connecting said second roller means to said carriage at points intermediate said ends whereby said first end portion of said carriage is cantilevered from the lower edge of said trailer side.

4. A trailer attachment supporting an auxiliary closet for longitudinal movement along an exterior side of said trailer comprising, in combination: a carriage structure positioned partially under said trailer with one end extending laterally from said trailer side for supporting the weight of said closet; a first longitudinal track means having its bearing surface facing downwardly secured under said trailer; a second longitudinal track means having its bearing surface facing upwardly secured adjacent the lower edge of said trailer side in spaced parallel relationship to said first track means; first roller means secured to the inner end of said carriage and facing upwardly to engage said first track bearing means; and second roller means coupled to said carriage and adapted to ride on said second track bearing surface, whereby said one end of said carriage is cantilevered from said trailer side, the force moment established by the weight of said closet with respect to said second track means being balanced by the force moment established by the force exerted by said first track on said first roller means.

5. A trailer attachment according to claim 4, including a drum carried by said carriage; a cable wound about said drum and having its free end portions coupled to spaced stationary points adjacent the front and rear of said trailer respectively; and means for rotating said drum whereby said carriage may be pulled by said cable longitudinally along said trailer side in either direction.

6. A trailer attachment according to claim 5, in which said means for rotating said drum comprises a reversible motor; safety switch means electrically connected to said motor and adapted to shut off said motor upon actuation, secured to opposite sides of said carriage; and stop means stationarily secured adjacent the front and rear of said trailer for actuating said safety switch means upon movement of said carriage to an extreme longitudinal position.

7. A trailer attachment according to claim 4, including a longitudinal support bar passing under that portion of said carriage structure adjacent the lower edge of said trailer side and terminating at points extending beyond the ends of said carriage sides; and band means arranged to encircle said ends of said support bar and extending upwardly to couple to said second roller means whereby removal of said bands from said support rod ends enable said carriage means and enclosure closet to be entirely removed from said trailer.

References Cited in the file of this patent

UNITED STATES PATENTS

| | | |
|---|---|---|
| D. 155,625 | Painter | Oct. 18, 1949 |
| 2,235,662 | Arehart | Mar. 18, 1941 |
| 2,760,238 | Lane | Aug. 28, 1956 |